Dec. 30, 1941.   W. F. PUNTE   2,268,303
SHEET METAL CAN
Filed May 13, 1939

Inventor
William F. Punte
By Mason & Porter
Attorneys

Patented Dec. 30, 1941

2,268,303

UNITED STATES PATENT OFFICE 2,268,303

SHEET METAL CAN

William F. Punte, Syracuse, N. Y., assignor to Continental Can Company, Inc., New York, N. Y., a corporation of New York Application May 13, 1939, Serial No. 273,530

1 Claim. (Cl. 220—59)

The invention relates to new and useful improvements in sheet metal can bodies and more particularly to a can body having the upper edge thereof rolled into a hollow bead with which a cover makes sealing contact and is held on the can body by clinching portions thereof around the bead. In my co-pending application Serial No. 138,028, filed April 20, 1937, there is shown a can body and closure therefor to which my improvements have been applied.

In the forming of a can body such as illustrated in my co-pending application, it has been the custom to join the side edges so that the portions thereof at the upper end of the seam are overlapped. When this upper edge portion is rolled into a hollow bead, there is a great strain on the solder bond and the edge of the upper lapping portion in the bead forms a shoulder which extends across the top surface of the bead in such a manner as to interfere with the forming of a tight seal between the cover and the can body. In accordance with the present invention, the blank from which the body is made is provided with a V-notch in the inner lapped portion of the side seam. This V-notch is so disposed that when the top edge is rolled outwardly to form a hollow bead and thus provide a holding means and a sealing surface for the cover, the V-notch is disposed so that the notch straddles the top surface of the bead. When the solder is applied to the side seam before the edge of the body is rolled into the hollow bead, it sweats in between the lapping portions of the seam and will more or less fill this V-notch, being thicker at the point of the V and thinning out toward the open end of the V. This results, when the bead is formed, in a smooth surface, which greatly aids in the producing of a tight seal when the gasket is forced against the bead by the clinching of the cover on to the can body. Furthermore, when the V-notch is formed in one of the overlapping solder bonded sections that is rolled outwardly to form the bead, there is very much less strain imposed upon the solder bond and less likelihood of the solder bond being ruptured by the formation of the bead.

The primary object of the present invention resides in the construction of the metal parts of the body blank so that when the upper edge portion is rolled into a bead it will present a smooth seat with which the sealing gasket may make a perfect sealing contact when the cover is applied.

A further object of the invention is to provide a body blank wherein the lapped portions of the side seam are so constructed that the strain incident to the forming of a hollow bead on the upper end of the can body is distributed, and therefore, the solder bond joining the lapping sections remains intact and free from rupture.

In the drawing—

Figure 1:
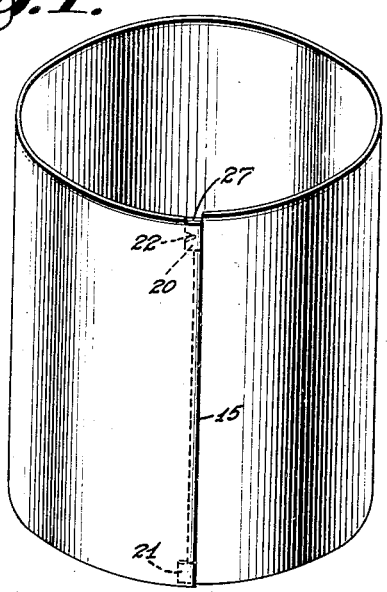
Figure 1 is a perspective of a can body formed from a body blank in which my invention is embodied, prior to the curling of the upper edge.
Figure 3:
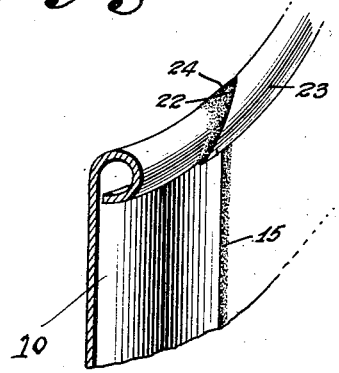
Fig. 3 is an enlarged detail perspective, showing the curled bead with the notch therein.
Figure 2:
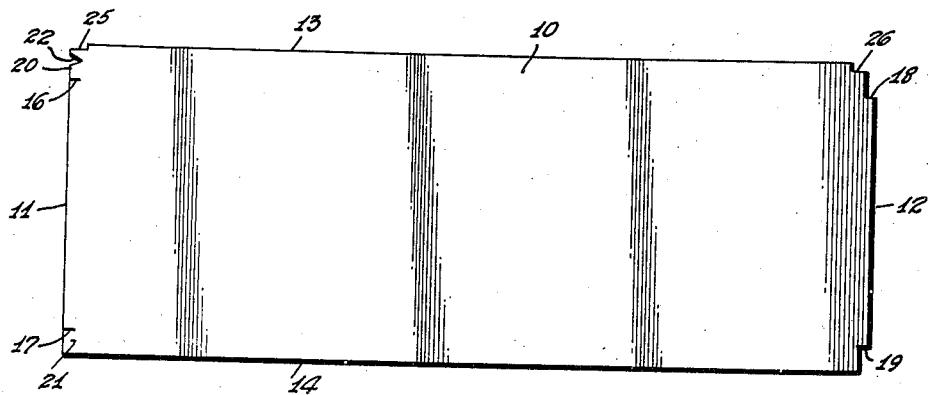
Fig. 2 is a plan view of the blank.

Referring more in detail to the drawing, a body blank indicated at 10 has its side edges 11 and 12 joined by a side seam 15 which extends from one end to the other of the can body. The edge 14 of the blank is double-seamed to a bottom end in the usual manner. The upper edge 13 of the body blank is rolled into a hollow bead as shown at 23 in Figure 3 of the drawing. The body blank is notched as indicated at 16 and 17 so that the edge portion 11 can be folded to provide a hook. The edge portion 12 is notched at 18 and 19 so that said edge portion can be folded to form a hook which is interlocked with the hook at the edge portion 11. This leaves the lapping sections 20 and 21 at the edge portion 11 of the blank, and similar lapping portions at the edge portion 12. The lapping portion 20 is provided with a V-notch 22. The upper edge portion is also notched as indicated at 25 and 26.

After the hooks have been interlocked and bumped, then the side seam is solder bonded and the solder will flow by capillary attraction throughout the entire portions of the interlocked hooks and the lapped sections. The V-notch 22 is at the inside of the seam. Solder, however, by capillary attraction will flow to the edge of the V-notch and beyond the edge as indicated at 24 in Figure 3 so as to partly fill the V-notch, filling the notch substantially full of the solder at the point of the V and gradually thinning out away from the edge of the V-notch until it vanishes into the surface of the outer lapping section.

When the upper edge portion of the can body is rolled outward to form the hollow bead such as indicated at 23, the V-notch is brought to the top of the bead so that it straddles the V, and the point of the V-notch is disposed centrally of the upper portion of the bead. During this rolling operation to form the bead, the metal, of course, is expanded and the solder bond joining the lapped sections is put under strain. When the inner lapping section is provided with a V-notch, the strain incident to the forming of the bead is progressively applied and distributed so that the solder bond joining these lapping sections is not ruptured.

The blank is notched at 25 and 26 so as to enable the bead to be rolled substantially into contact with the body wall. The interlocking hooks of the side seam extend up beneath the bead, and these notches form a space 27 for the seam which lies on the outer side of the can body.

Figure 4:
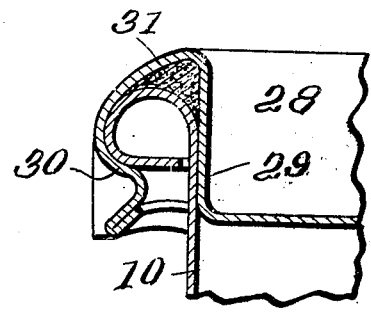
Fig. 4 is a vertical sectional view through a portion of the can body and cover showing the can sealed.

In Figure 4 of the drawing, there is shown a cover applied to the can body, which cover is indicated at 28. The cover has a depression formed therein providing a vertical wall 29 which extends within the can body contacting with the inner wall thereof. The cover also has a depending skirt 30 which is adapted to be clinched beneath the hollow bead for securing the cover in sealing contact with the container body. Located in the channel formed by the vertical wall 29 and the depending skirt 30 is a sealing gasket 31. When the cover is applied, the sealing gasket is pressed against the upper portion of the bead and while so held, the skirt of the cover is shaped so as to clinch beneath the bead and hold the cover in sealed contact with the container body. The manner of securing the cover to the can body is fully shown and described in my copending application. When the sealing gasket is forced against the upper portion of the bead, it will contact with the solder 24, and inasmuch as the solder fills the point of the V-notch and also fills the notch along the edges thereof, gradually tapering off in thickness, there is no abrupt shoulder along which a seal must be formed. In other words, the sealing gasket will tightly seal the container all along the upper surface of the bead.

It is obvious that minor changes in the details of construction may be made without departing from the spirit of the invention as set forth in the appended claim.

Having thus described the invention, what I claim as new and desire to secure by Letters Patent is:

A sheet metal container comprising a body portion having its edges joined by a solder-bonded side seam having lapping portions at the ends thereof, said body portion at one end thereof being rolled outwardly, downwardly and inwardly into a hollow bead, the inner lapping portion at the upper end of the side seam having a V-shaped notch disposed so that the notch straddles the top surface of the bead, the solder bonding the side seam being extended into the V-notch so as to substantially fill the same at the point of the V and thin out toward the open ends of the V whereby the upper surface of the bead is free from sharp bends or shoulders, and a closure member for said container having a central depressed portion fitting within the container body and a depending skirt adapted to be bent beneath the hollow bead for securing the closure member to the container body, said closure member having a sealing gasket disposed between the depressed portion and the skirt and making sealing contact with the upper surface of the hollow bead.

WILLIAM F. PUNTE.